United States Patent
Maheshwari et al.

(10) Patent No.: US 12,388,779 B2
(45) Date of Patent: Aug. 12, 2025

(54) MESSAGE ROUTING SYSTEM

(71) Applicant: Barclays Execution Services Limited, London (GB)

(72) Inventors: Nikhil Maheshwari, Pune (IN); Arvind Khatik, District Chittorgarh (IN); Harikrishnan Ravi Pillai, Pune (IN); Siddharth Jain, Sikar (IN)

(73) Assignee: Barclays Execution Services Limited, London (GB)

( * ) Notice: Subject to any disclaimer, the term of this patent is extended or adjusted under 35 U.S.C. 154(b) by 0 days.

(21) Appl. No.: 18/582,538

(22) Filed: Feb. 20, 2024

(65) Prior Publication Data
US 2024/0283767 A1 Aug. 22, 2024

(30) Foreign Application Priority Data
Feb. 20, 2023 (EP) ..................................... 23157649

(51) Int. Cl.
*H04L 51/23* (2022.01)
(52) U.S. Cl.
CPC .................................. *H04L 51/23* (2022.05)
(58) Field of Classification Search
CPC ........ H04L 45/38; H04L 45/306; G06F 9/546
See application file for complete search history.

(56) References Cited

U.S. PATENT DOCUMENTS

| | | | |
|---|---|---|---|
| 7,103,680 B1 * | 9/2006 | Holsworth | H04L 67/562 709/201 |
| 10,666,712 B1 * | 5/2020 | Dandekar | H04L 67/10 |
| 2015/0020161 A1 | 1/2015 | Mizhar | |
| 2018/0109625 A1 | 4/2018 | Jayaraman et al. | |
| 2018/0167476 A1 * | 6/2018 | Hoffner | H04L 67/55 |
| 2019/0075192 A1 * | 3/2019 | Mamas | H04L 67/55 |
| 2020/0280448 A1 | 9/2020 | Ithal et al. | |
| 2021/0176326 A1 * | 6/2021 | Carley | H04L 51/046 |

OTHER PUBLICATIONS

No Author, "Introduction to Spring Cloud Stream," last retrieved on Nov. 28, 2022 from https://www.baeldung.com/spring-cloud-stream (17 total pages).

(Continued)

*Primary Examiner* — Caroline H Jahnige
(74) *Attorney, Agent, or Firm* — Wilmer Cutler Pickering Hale and Dorr LLP

(57) ABSTRACT

A message routing system is disclosed. The message routing system comprises a message routing module, a routing configuration module configured to provide a routing configuration for one or more content messages, a first binder module configured to connect a first data streaming application to the message routing module using one or more channels, and a second binder module configured to connect a second data streaming application to the message routing module using one or more channels. The message routing module is configured to receive a content message from a data streaming application and a corresponding routing configuration for the content message from the routing configuration module, and route the content message according to the corresponding routing configuration using a stream bridge interface.

17 Claims, 9 Drawing Sheets

(56) References Cited

OTHER PUBLICATIONS

No Author, "Bound Services Overview," last retrieved Nov. 28, 2022 from https://developer.android.com/guide/components/bound-services (18 total pages).
Basig, L., et al., "Reliable Event Routing in the Cloud and on the Edge An Internet-of-Things Solution in the AgeTech Domain," Conference Paper: European Conference on Software Architecture (ECSA), Lecture Notes in Computer Science (LNCS), vol. 12857, pp. 243-259 (first available online Aug. 26, 2021).
Extended European Search Report issued Aug. 7, 2023 by European Patent Office in European Patent Application No. 23157649.7 (6 total pages).

* cited by examiner

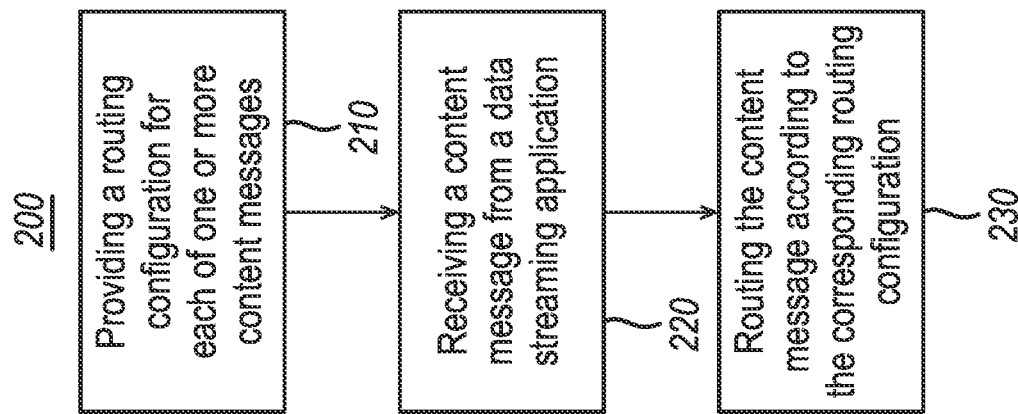
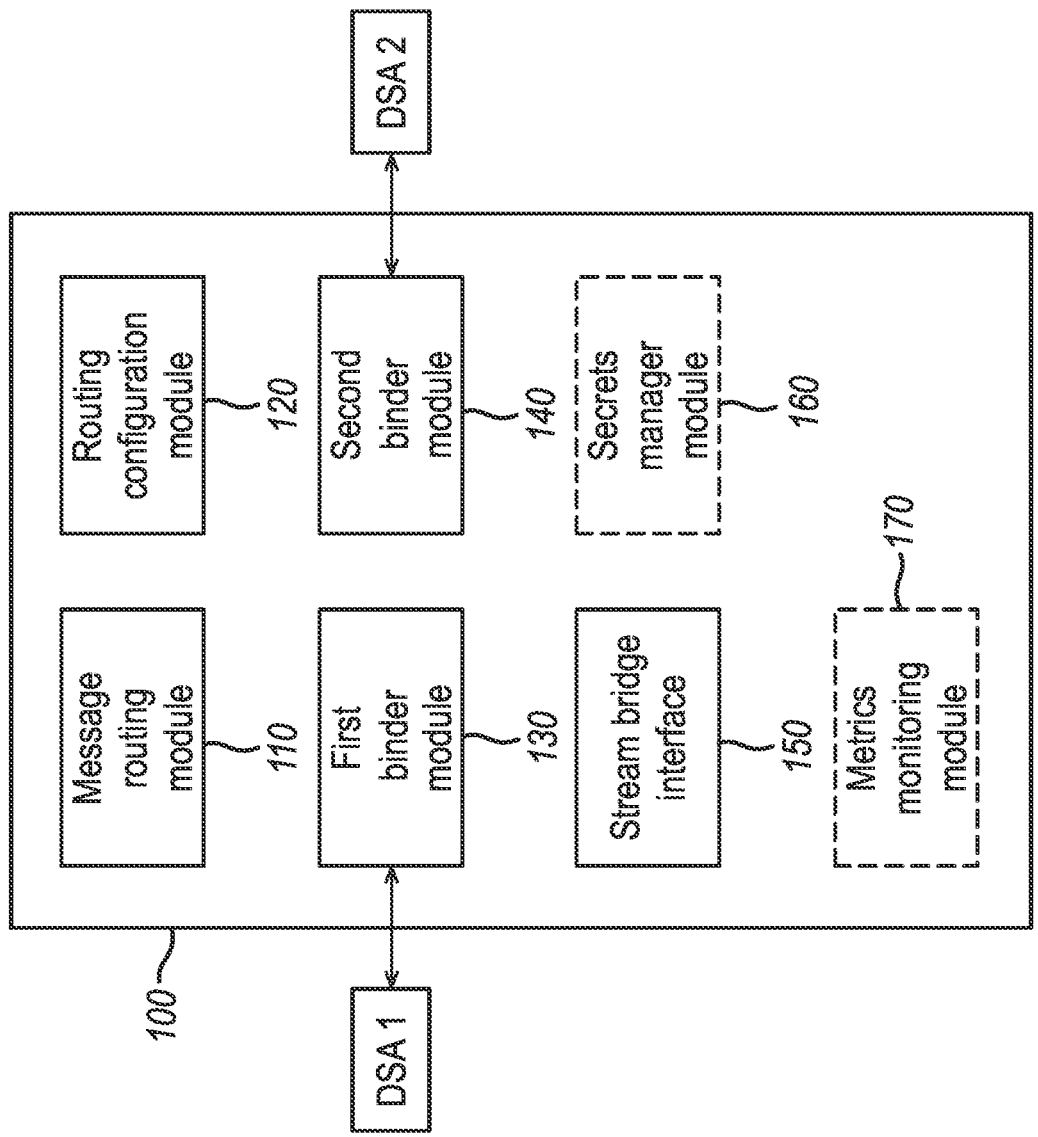

MESSAGE ROUTING SYSTEM

CROSS-REFERENCE TO RELATED APPLICATION

This application claims priority to European Patent Application No. 23157649.7, filed on Feb. 20, 2023, in the European Patent Office, the entire contents of which are incorporated by reference herein in their entirety.

FIELD OF INVENTION

The present invention relates to the field of message routing, in particular routing of content messages between data streaming applications using a message routing system.

BACKGROUND

The use of data streaming services has become increasingly prevalent in recent years, as more and more organisations have come to rely on real-time data to drive their business operations. These services typically involve the continuous ingestion of large amounts of data, which is then processed and used to generate insights or drive actions.

However, in an enterprise level application where large teams work independently, the choice of data streaming services (which are also known as "messaging systems" or "messaging platforms"), such as Amazon Managed Kafka and Amazon Kinesis, could differ from one team to another on the basis of use cases, expertise, scalability, etc. For an overall application integration, these data streaming services need to have some mode of interaction established which takes away the complexity around data formats and communication protocols and enable messages to be read reliably.

To illustrate this with an example, consider two systems: system A with Amazon Web Services (AWS) Managed Kafka as its choice of data streaming service, and system B with Amazon Kinesis as its choice of data streaming service. For system B to consume events originating from system A, system B would have to include specific capabilities that are purposed for reading data from the data streaming service implemented by system A—these may conflict with the agreed technical preferences of system B. Moreover, system A may not be able to publish events to system B as it is not its responsibility.

As a result, there is a need for solution that can more effectively facilitate communication between data streaming services.

SUMMARY OF THE DISCLOSURE

In one aspect of the present disclosure, there is provided a message routing system. The message routing system comprises: a message routing module, a routing configuration module, a first binder module, a second binder module. The routing configuration module is configured to provide a routing configuration for each of one or more content messages, each routing configuration comprising a source of the respective content message and one or more targets for the respective content message, each of the source and the one or more targets being characterised by a channel and an address. The first binder module is configured to connect a first data streaming application to the message routing module using one or more channels, and to enable a content message to be routed to and/or from the first data streaming application. The second binder module is configured to connect a second data streaming application to the message routing module using one or more channels, and to enable a content message to be routed to and/or from the second data streaming application. The first data streaming application is associated with a first cloud-based account and the second data streaming application is associated with a second cloud-based account. The message routing module configured to: receive a content message from a data streaming application and a corresponding routing configuration for the content message from the routing configuration module, and route the content message according to the corresponding routing configuration using a stream bridge interface.

In this way, the message routing system enables data streaming applications to interact with each other in a dynamic manner without requiring specific adapters to be built for the data streaming applications. Advantageously, the message routing system improves the interoperability of data streaming applications and makes it easier for organisations to integrate cross-account event interaction between systems. Also, the use of routing configurations allows content messages to be routed between data streaming applications in a configurable and flexible way.

In some embodiments, an address characterising a source or a target may designate a content message stream at a corresponding data streaming application.

In this way, the address contained in a routing configuration can specify a particular content stream at a respective data streaming application from which a content message is to be routed or to which a content message is to be routed.

In some embodiments, the message routing module may be further configured to: determine that the content message has been delivered; and upon determining that the content message has been delivered, send an acknowledgement to the respective data streaming application specified as the source in the corresponding routing configuration, so as to trigger data offset to be committed with respect to the delivered content message at the respective data streaming application.

In this way, the message routing system can minimise data loss by ensuring data offset is only committed upon successful delivery of the content message.

In some embodiments, the first data streaming application may be selected from a list including: Amazon Managed Streaming for AWS Managed Kafka, Amazon Kinesis, Rabbit MQ, Amazon Simple Notification Service, Amazon Simple Queue Service, and Apache RocketMQ, and the second data streaming application may be another data streaming application selected from the list.

In some embodiments, the message routing system may be deployed on a consumer domain.

In this way, a consumer on the consumer domain is provided with the capability to read content messages from a producer system.

In some embodiments, the message routing system may further comprise a secrets manager module configured to rotate one or more secrets associated with at least one of the first and second data streaming applications based on a predetermined configuration.

In this way, the message routing system can reduce the risk of unauthorised access to the data streaming applications and ensure that data streaming applications are using the most current credentials In some embodiments, at least one of the first and second binder modules may comprise a health endpoint configured to: acquire one or more health status parameters of the respective data streaming application, wherein the one or more health status parameters comprises a secrets rotation parameter indicating whether a secret associated with the respective data streaming application is rotated; and restart the respective data streaming application if at least one of one or more health status parameters does not meet a predetermined criterion.

In this way, the message routing system can ensure that respective data streaming applications are functioning properly and that issues (e.g. relating to secrets management) that may affect the performance or stability of the data streaming applications are minimised.

In some embodiments, the message routing module may be configured to receive the content message by pulling the content message from the respective data streaming application.

In this way, the message routing system can ensure that the content messages to be routed from a respective data streaming application are properly retrieved from said data streaming application.

In some embodiments, the routing configuration for a content message may comprise a source of the respective content message and a plurality of targets for the respective content message.

In this way, the message routing system provides the capability of allowing a content message to be routed to multiple targets (e.g. multiple content message streams).

In some embodiments, the message routing system may further comprise a metrics monitoring module configured to determine at least one of a number of content messages received from one of the first data streaming application and the second data streaming application that have been successfully delivered and a number of content messages received from one of the first data streaming application and the second data streaming application that failed to be delivered.

In this way, the message routing system can provide useful metrics that enable the performance and the behaviour of the message routing system (and/or data streaming applications) to be tracked and monitored.

In another aspect of the present disclosure, there is provided a computer-implemented method for operating a message routing system. The message routing system comprises a message routing module, a routing configuration module, a first binder module configured to connect a first data streaming application to the message routing module using one or more channels, the first binder module being configured to enable a content message to be routed to and/or from the first data streaming application, and a second binder module configured to connect a second data streaming application to the message routing module using one or more channels, the second binder module being configured to enable a content message to be routed to and/or from the first data streaming application. The method comprises: providing, by the routing configuration module, a routing configuration for each of one or more content messages, each routing configuration comprising a source of the respective content message and one or more targets for the respective content message, and wherein each of the source and the one or more targets is characterised by a channel and an address; receiving, at the message routing module, a content message from one of a first data streaming application and a second data streaming application, and a corresponding routing configuration for the content message from the routing configuration module; and routing, by the message routing module, the content message according to the corresponding routing configuration using a stream bridge interface. The first data streaming application is associated with a first cloud-based account and the second data streaming application is associated with a second cloud-based account.

The method enables data streaming applications to interact with each other in a dynamic manner without requiring specific adapters to be built for the data streaming applications. Advantageously, the method improves the interoperability of data streaming applications and makes it easier for organisations to integrate cross-account event interaction between systems. Also, the use of routing configurations in the method allows content messages to be routed between data streaming applications in a configurable and flexible way.

In some embodiments, the method may further comprise: determining, by the message routing module, that the content message has been delivered; and upon determining that the content message has been delivered, sending, by the message routing module, an acknowledgement to the respective data streaming application specified as the source in the corresponding routing configuration, so as to trigger data offset to be committed with respect to the delivered content message at the respective data streaming application.

In some embodiments, at least one of the first and second binder modules may comprise a health endpoint, and in these embodiments the method may further comprise: acquiring, by a health endpoint of a binder module, one or more health status parameters of the respective data streaming application, wherein the one or more health status parameters comprises a secrets rotation parameter indicating whether a secret associated with the respective data streaming application is rotated; and restarting the respective data streaming application if at least one of one or more health status parameters does not meet a predetermined criterion.

In some embodiments, the first data streaming application may be selected from a list including: Amazon Managed Streaming for AWS Managed Kafka, Amazon Kinesis, Rabbit MQ, Amazon Simple Notification Service, Amazon Simple Queue Service, and Apache RocketMQ, and the second data streaming application may be another data streaming application selected from the list.

In some embodiments, the message routing system may further comprise a secrets manager module, and in these embodiments the method may further comprise rotating, by the secrets manager module, one or more secrets associated with at least one of the first and second data streaming applications based on a predetermined configuration.

In some embodiments, receiving the content message at the message routing module may comprise pulling the content message from the respective data streaming application.

In some embodiments, the message routing system may further comprise a metrics monitoring module, and in these embodiments the method may further comprise determining, by the metrics monitoring module, at least one of a number of content messages received from one of the first data streaming application and the second data streaming application that have been successfully delivered and a number of content messages received from one of the first data streaming application and the second data streaming application that failed to be delivered.

In another aspect of the present disclosure, there is provided a cloud computing environment system comprising the message routing system as described herein.

In another aspect of the present disclosure, there is provided computer hardware configured to implement the message routing system as described herein, the method as described herein, or the cloud computing environment system as described herein.

BRIEF DESCRIPTION OF FIGURES

The present disclosure is described with reference to the accompanying figures, in which:

FIG. 1 is a block diagram of a message routing system according to the present disclosure.

FIG. 2 is a flow diagram of a method for operating a message routing system according to the present disclosure.

DETAILED DESCRIPTION

Figure 3:
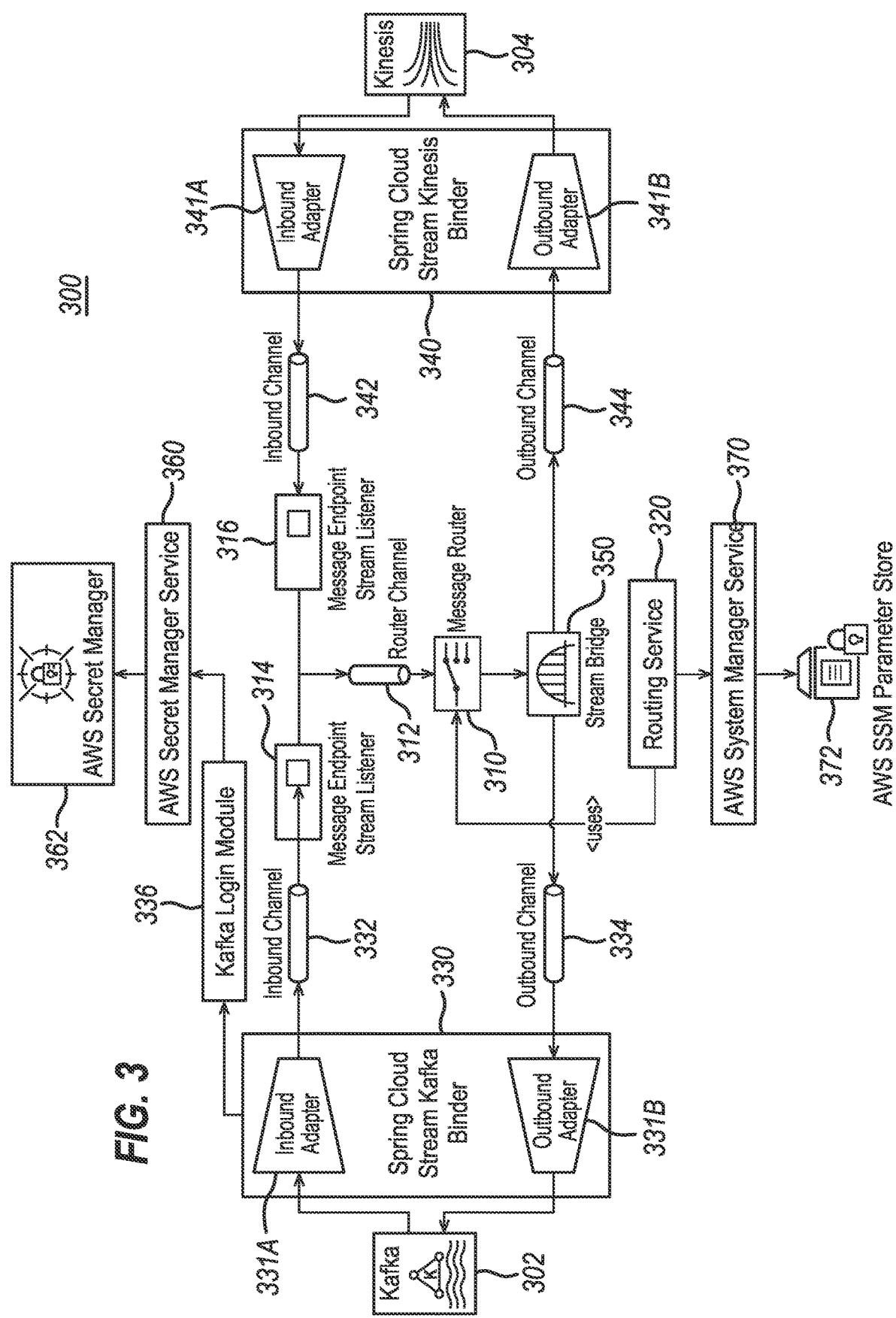
FIG. 3 is a computer architecture diagram of an exemplary message routing system according to the present disclosure.

The present invention is described in detail below by way of example only.

The proposed message routing system is designed to address the need to enable data streaming services (herein referred to as "data streaming applications") to interact with each other in an event-driven fashion by providing a flexible mechanism for routing content messages between systems and/or domains without requiring additional adapters. This message routing system replaces the need to build point-to-point architecture as it can be implemented as a component at the integration layer outside the core of the system domain, where business logic is implemented, and achieve separation of concerns between the core processing and the interaction. Furthermore, the message routing system may be available as a service catalogue product.

The proposed message routing system relies on the use of routing configurations for content messages which follow a format to dictate how content messages should be routed, thus providing an enhanced level of configurable dynamic routing and eliminating the need for developers to developer specific adapters for producing and consuming events. Overall, the proposed message routing system can significantly improve the interoperability of data streaming applications, making it easier for organisations to integrate relevant systems for any cross-account event interaction.

FIG. 1 is a block diagram of a message routing system according to the present disclosure. As shown in the diagram, the message routing system 100 comprises a message routing module 110, a routing configuration module 120, a first binder module 130, a second binder module 140, a stream bridge interface 150, a secrets manager module 160, and a metrics monitoring module 170.

Also, as shown in FIG. 1, external to the message routing system 100, there is provided a first data streaming application DSA1 and a second data streaming application DSA2. The first data streaming application DSA1 is associated with a first cloud-based account, and the second data streaming application DSA2 is associated with a second cloud-based account. The first and second cloud-based accounts may be hosted on a third-party cloud environment such as Amazon Web Services (AWS). In some embodiments, the first and second cloud-based accounts may be different accounts.

The first data streaming application DSA1 may be selected from a list including: Amazon Managed Streaming for AWS Managed Kafka, Amazon Kinesis, Rabbit MQ, Amazon Simple Notification Service, Amazon Simple Queue Service, and Apache RocketMQ. The second data streaming application DSA2 may be another data streaming application selected from the same list. For example, the first data streaming application DSA1 may be AWS Managed Kafka, and the second data streaming application DSA2 may be Amazon Kinesis. Since the underlying framework for the message routing system 100 (as explained in more detail in below) supports data streaming applications including Amazon Simple Notification Service, Amazon Simple Queue Service, and Apache Rabbit MQ, the message routing system 100 can be extended not listed herein by implementing specific binder modules.

In the present embodiment, the message routing system 100 relies on Spring Cloud Stream which is a framework for building scalable event-driven services connected with shared messaging systems (or "data streaming applications"). Spring Cloud Stream is built on top of Spring Integration, which is a framework that provides an extension to the Spring Framework that enables the integration of an application with external systems by providing a set of components that can be used to connect different systems together and allows for the exchange of data between those systems. Spring Integration supports the Enterprise Integration Patterns, which are a set of patterns that describe how to design and implement the integration of systems. Spring Cloud Stream relies on the use of channels—as explained in further detail below, binder modules of the message routing system use channels (i.e. data pipes) to connect data streaming applications to the message routing module 110 of the message routing system 100. As also will be explained in further detail below, a channel can be designated in a routing configuration of a content message so that the content message can be routed via the designated channel accordingly.

The binder abstraction enables a Spring Cloud Stream application to be flexible in how it connects to any middleware. In the present embodiment, a binder module is a component that provides services to connect with a data streaming application and can provide inbound and outbound adapters to connect to message streams at the data streaming application. Messages are received from inbound adapters and sent using the outbound adapters. Multiple binder modules can be provided for multiple data streaming applications, and each binder module generates different channels for communication between producers and consumer of events.

In the present embodiment, the first binder module 130 is configured to connect the first data streaming application DSA1 to the message routing module 110 using one or more channels, and to enable a content message to be routed to and/or from the first data streaming application DSA1. If the first data streaming application DSA1 is AWS Managed Kafka, then the first binder module would be a Kafka binder. If the first data streaming application is Amazon Kinesis, then the first binder module would be a Kinesis binder. Similarly, the second binder module 140 is configured to connect the second data streaming application DSA2 to the message routing module 110 using one or more channels, and to enable a content message to be routed to and/or from the second data streaming application DSA2.

For the first and second binder modules 130, 140, inbound consumer channels may have names or identifiers such as "kafka-in-0" (for AWS Managed Kafka) and "kinesis-in-0" (for Amazon Kinesis). Similarly, outbound producer channels may have names or identifiers such as "kafka-out-0" (for AWS Managed Kafka) and "kinesis-out-0" (for Amazon Kinesis). These name or identifiers may be used in routing configurations to designate the corresponding channels.

The routing configuration module 120 is configured to provide a routing configuration for each of one or more content messages. Each routing configuration comprises a source of the respective content message and one or more targets for the respective content message. Each of the source and the one or more targets is characterised by a channel and an address. In some embodiments, the routing configuration for a content message may comprise a source of the respective content message and a plurality of targets for the respective content message. This means that the content message is to be routed to multiple content message streams at the receiving data streaming application.

Furthermore, an address characterising a source or a target may designate a content message stream at a corresponding data streaming application. For example, if the first data streaming application DSA1 is AWS Managed Kafka and the content message is from the first data streaming application, an address characterising the source in a routing configuration corresponding this content message may designate a particular Kafka topic at the first data streaming application DSA1. As another example, if the second data streaming application DSA2 is Amazon Kinesis and the content message is to be routed to the second data streaming application DSA2, an address characterising the target in a routing configuration corresponding to this content message may designate a particular Amazon Kinesis stream at the second data streaming application DSA2.

An example of a routing configuration (or at least a portion of it) for a content message that is to be routed from AWS Managed Kafka to both Amazon Kinesis and AWS Managed Kafka is provided below:

```
routing:
  message:
    source:
      channel: kafka-in-0 //Kafka Inbound Channel Binding
      address: kafka-topic-1 // Pull the data from Kafka Source Destination topic
    target:
      channel: kinesis-out-0 //Kinesis Outbound Channel Binding
      address: kinesis-target-stream // Push the data to Kinesis target destination stream
      channel: kafka-out-0 //Kafka Outbound Channel Binding
      destination: kafka-topic-2 // Push the data to Kafka target destination topic
```

In this example, the routing configuration comprises one source and two targets. The source is characterised by the channel "kafka-in-0" (designating a specific inbound channel at Kafka) and the address "kafka-topic-1" (designating a specific Kafka topic). The first target is characterised by the channel "kinesis-out-0" (designating a specific outbound channel at Amazon Kinesis) and the address "kinesis-target-stream" (designating a specific Kinesis stream by its name). The second target is characterised by the channel "kafka-out-0" (designating a specific outbound channel at Kafka) and the address "kafka-topic-2" (designating a specific Kafka topic).

Another example of a routing configuration (or a portion of it) for a content message that is to be routed from Amazon Kinesis to Amazon Kinesis is provided below:

```
routing:
  message:
    source:
      channel: kinesis-in-0 //kinesis Inbound Channel
      address: kinesis-source-stream //kinesis Stream Name
    target:
      channel: kinesis-out-0 //kinesis Outbound Channel
      address: kinesis-target-stream //kinesis out bound Stream Name
```

In this example, the routing configuration comprises one source and one target. The source is characterised by the channel "kinesis-in-0" (designating a specific inbound channel at Amazon Kinesis) and the address "kinesis-source-stream" (designating a specific Kinesis stream by name). The target is characterised by the channel "kinesis-out-0" (designating a specific outbound channel at Amazon Kinesis) and the address "kinesis-target-stream" (designating a specific Kinesis stream by name).

It will be appreciated although in the examples of routing configurations provided above the sources and the targets are each characterised by an "address", in alternative embodiments, routing configurations may use other terms, such as "destination", in lieu of "address" to designate the content message stream at a corresponding data stream application.

The message routing module 110 configured to receive a content message from a data streaming application (i.e. the first data streaming application DSA1 or the second data streaming application DSA2) and a corresponding routing configuration for the content message from the routing configuration module 120. In some embodiments, the message routing module 110 may be configured to receive the content message by pulling the content message from the respective data streaming application. The message routing module 110 is further configured to route the content message according to the corresponding routing configuration using the stream bridge interface 150. The stream bridge interface 150 is a component that allow content messages to be routed from one data streaming application to another by enabling content messages to be directly sent to output channels of binder modules.

The message routing module 110 may be further configured to determine that the content message has been delivered, and upon determining that the content message has been delivered, to send an acknowledgement to the respective data streaming application specified as the source in the corresponding routing configuration, so as to trigger data offset to be committed with respect to the delivered content message at the respective data streaming application. This data offset may be committed with respect to a corresponding partition at the data streaming application. The content messages may be read using the TRIM_HORIZON policy, which means that data streaming is performed starting from the oldest data record in the respective data sequence. Therefore, by triggering data offset commit only upon receiving an acknowledgement that the content message has been delivered, the message routing module 110 can guarantee delivery of content messages and ensure that there is no data loss when events (represented by content messages) from one cloud-based account flows into another cloud-based account. In some embodiments, in case of delivery failure, the content message may remain in the message queue. Also, the message routing module 110 may be configured to perform a configurable number of delivery retries (i.e. of routing the content message).

The secrets manager module 160 is configured to rotate one or more secrets associated with at least one of the first and second data streaming applications DSA1, DSA2 based on a predetermined configuration. Although FIG. 1 shows the secrets manager module 160 as a component of the message routing system 100, it is possible that in alternative embodiments the message routing system 100 may not comprise a secrets manager module. In these alternative embodiments, a secrets manager module may be implemented as a component external to the message routing system 100.

In some embodiments, at least one of the first and second binder modules 130, 140 may comprise a health endpoint. The health endpoint may be configured to acquire one or more health status parameters of the respective data streaming application, the one or more health status parameters comprising a secrets rotation parameter indicating whether a secret associated with the respective data streaming application is rotated. The health endpoint may be further configured to restart the respective data streaming application if at least one of one or more health status parameters does not meet a predetermined criterion. The secrets rotation parameter may be acquired from the secrets manager module 160, or in the case where a secrets manager module is implemented as a component external to the message routing system, from said external secrets manager module.

The metrics monitoring module 170 is configured to determine at least one of a number of content messages received from one of the first data streaming application DSA1 and the second data streaming application DSA2 that have been successfully delivered, and a number of content messages received from one of the first data streaming application DSA1 and the second data streaming application DSA2 that failed to be delivered. In some embodiments, the metrics monitoring module 170 may be further configured to determine at the number of content messages that is received by at least one of the first and second data streaming applications.

Although FIG. 1 shows the metrics monitoring module 170 as a component of the message routing system 100, it is possible that in alternative embodiments the message routing system 100 may not comprise a metrics monitoring module 170. In these alternative embodiments, a metrics monitoring module may be implemented as a component external to the message routing system 100.

In some embodiments, the message routing system 100 may be deployed on a consumer domain. This provides the consumer with the capability to read from the producer system, which typically it is not capable of doing.

It will be appreciated that in some embodiments the message routing system 100 may comprise additional components that are not illustrated in FIG. 1. For example, the message routing system 100 may further comprise a login module configure to authenticate and authorise clients that connect to a data streaming application. This login module is explained in further detail with reference to FIG. 3.

FIG. 2 is a flow diagram of a method for operating a message routing system, for example message routing system 100, according to the present disclosure. For ease of illustration, the steps of method 200 will be described herein with reference to the various components of the message routing system 100 as shown in FIG. 1.

The computer-implemented method 200 begins with step 210 at which a routing configuration for each of one or more content messages is provided by the routing configuration module 120 of the message routing system 100. Each routing configuration comprises a source of the respective content message and one or more targets for the respective content message, and each of the source and the one or more targets is characterised by a channel and an address. An address characterising a source or a target may designate a content message stream at a corresponding data streaming application.

As mentioned above, in some embodiments a routing configuration may comprise more than one targets for a content message, thus enabling a content message to be routed to multiple destination content message streams.

Then, at step 220, a content message is received at the message routing module 110 from one of the first data streaming application 210 and the second data streaming application 220. In some embodiments, the content message may be pulled by the message routing module 110 from the respective data streaming application. A corresponding routing configuration for the content message is also received from the routing configuration module 120 at step 220.

Subsequently, at step 230 the content message is routed by the message routing module 110 according to the corresponding routing configuration using the stream bridge interface 150.

Although not illustrated in FIG. 2, the method 200 may further comprise an optional step at which the message routing module 110 determines that the content message has been delivered, and a further optional step at which an acknowledgement is sent by the message routing module 110 to the respective data streaming application specified as the source in the corresponding routing configuration upon determining that the content message has been delivered, so as to trigger data offset to be committed with respect to the delivered content message at the respective data streaming application. Moreover, in some embodiments, the method may further comprise performing, by the message routing module 110, a configurable number of delivery retries in case of a delivery failure of a content message.

As mentioned above with respect to FIG. 1, in some embodiments at least one of the first and second binder modules 130, 140 of the message routing system 100 comprises a health endpoint. In these embodiments, the method 200 may further comprise an optional step at which one or more health status parameters of the respective data streaming application are acquired by a health endpoint of a binder module, and a further optional step at which the respective data streaming application is restarted if at least one of one or more health status parameters does not meet a predetermined criterion. In these embodiments, the one or more health status parameters may comprise a secrets rotation parameter which indicates whether a secret associated with the respective data streaming application is rotated.

As mentioned above with respect to FIG. 1, in some embodiments the message routing system 100 may further comprise a metrics monitoring module 170. In these embodiments, the method 200 may further comprise determining, by the metrics monitoring module 170, at least one of: a number of content messages received from one of the first data streaming application and the second data streaming application that have been successfully delivered and a number of content messages received from one of the first data streaming application and the second data streaming application that failed to be delivered. Furthermore, in some embodiments, the method may further comprise determining, by the metrics monitoring module 170, the number of content messages that is received by at least one of the first and second data streaming applications.

It will be appreciated that the method described with reference to FIG. 2 has been shown as individual steps carried out in a specific order. However, the skilled person will appreciate that these steps may be combined or carried out in a different order whilst still achieving the desired result. Also, the skilled person will appreciate that the steps that are described as optional may be omitted whilst still achieving the desired result.

FIG. 3 is an exemplary computer architecture diagram of a message routing system according to the present disclosure. The message routing system 300 of FIG. 3 represents a specific example of the message routing system 100 of FIG. 1, where the first data streaming application is AWS Managed Kafka, and the second data streaming application is Amazon Kinesis. The architecture diagram of FIG. 3 illustrates in more detail the possible connections and interrelationships between some of the components of a message routing system according to embodiments of the present disclosure.

In the present embodiment, the message routing system 300 comprises a message routing module 310 (which can be referred to as a "message router"), a routing configuration module 320 (which can be referred to as a "routing service"), a first binder module 330 corresponding to AWS Managed Kafka, a second binder module 340 corresponding to Amazon Kinesis, a login module 336, a stream bridge interface 350, a secrets manager module 360, and a system manager module 370. External to the message routing system 300, there is provided the first data streaming application, i.e. AWS Managed Kafka, and the second data streaming application, i.e. Amazon Kinesis. There is also provided externally an external secret manager module 362 and a parameter store 372.

As shown in FIG. 3, the first binder module 330 is connected to the first data streaming application 302 and to the message routing module 310, thus enabling communication between these two components. The first binder module 330 comprises a first inbound adapter 331A and a first outbound adapter 331B, the first inbound adapter 331A being configured to connect the first data streaming application 302 to a first inbound channel 332. Furthermore, the first inbound channel 332 is configured to enable content messages that have been received from the first data streaming application 302 via the first inbound adapter 331A to be routed towards a first message endpoint stream listener 314 (which is configured to listen for and process content messages) and the router channel 312 before reaching the message routing module 310. In a similar fashion, the first outbound adapter 331B is configured to connect the first data streaming application 302 to the first outbound channel 334, the first outbound channel 334 being configured to enable content messages from the message routing module 310 that have passed the stream bridge interface 350 to be routed to the first data streaming application 302 via the first outbound adapter 331B.

The second binder module 340 is connected to the second data streaming application 304 and to the message routing module 310, thus enabling communication between these two components. The second binder module 340 comprises a second inbound adapter 341A and a second outbound adapter 341B, the second inbound adapter 341A being configured to connect the second data streaming application 304 to a second inbound channel 342. Furthermore, the second inbound channel 342 is configured to enable content messages that have been received from the second data streaming application 304 via the second inbound adapter 341A to be routed towards a second message endpoint stream listener 306 (which is configured to listen for and process content messages) before reaching the message routing module 310. Similarly, the second outbound adapter 341B is configured to connect the second data streaming application 304 to the second outbound channel 344, the second outbound channel 344 being configured to enable content messages from the message routing module 310 that have passed the stream bridge interface 350 to be routed to the second data streaming application 304 via the second outbound adapter 341B.

As mentioned above, the message routing module 310 receives content messages from the first and second data streaming applications 302, 204 via the first and second inbound channels 332, and 342. The message routing module 310 also receives routing configurations corresponding to these content messages from the routing configuration module 320. Therefore, the message routing module can route these content messages according to corresponding routing configurations, using the stream bridge interface 350.

In this example, the routing configuration module 320 is connected to a system manager module 370. The system manager module 370 may be configured to monitor and record/publish routing configurations provided by the routing configuration module 320 and/or to provide notifications related to changes in routing configurations provided by the routing configuration module 320. The system manager module 370 may be, for example, an Amazon Web Services (AWS) System Manager (SSM) Service. The system manager module 370 is further connected to a parameter store 372, which may be configured to store routing configurations (and data associated with the routing configurations). The parameter store 372 may be, for example, an AWS SSM Parameter Store. The routing configuration module 320 is configured to retrieve routing configuration(s) from the parameter store 372 using the system manager module 370.

Moreover, in this example, there is provided a login module 336 connected to the first binder module 330. The login module 336 is configured to authenticate and authorise clients that connect to the first data streaming application 302 (which is AWS Managed Kafka, in this case). In some embodiments, the login module 336 may include a Simple Authentication Security Layer (SASL), which is a framework that provides mechanisms for authentication and allows applications to securely exchange data. One of these mechanisms may be Salted Challenge Response Authentication Mechanism (SCRAM), which is a challenge-response mechanism which requires a client to provide a response to a challenge to prove its identity. SASL and SCRAM may use usernames and passwords. These credentials may be created during installation. In some embodiments, one or more passwords for the first data streaming application 302 may be generated and stored in the secrets manager module 360. The login module 336 is further connected to a secrets manager module 360, which in turn is connected to an external secrets manager module 362. In this embodiment, the secrets manager module 360 and the external secrets manager module 362 may be collectively configured to rotate one or more secrets associated with the first data streaming application 302 based on a predetermined configuration. The secrets may include sensitive data and/or credentials such as usernames and passwords.

The arrangement shown in FIG. 3 provides an advantage over existing cross-account communication techniques between AWS Managed Kafka and Amazon Kinesis (e.g. Kinesis Connector by Confluent) since it does not require deployment of the connector/message routing system on the producer side. This advantage is particularly relevant in Event Driven Architecture and Domain-Driven Design (DDD), in which the work of the producer is considered complete when it has published the event in its messaging queue.

Figure 4:
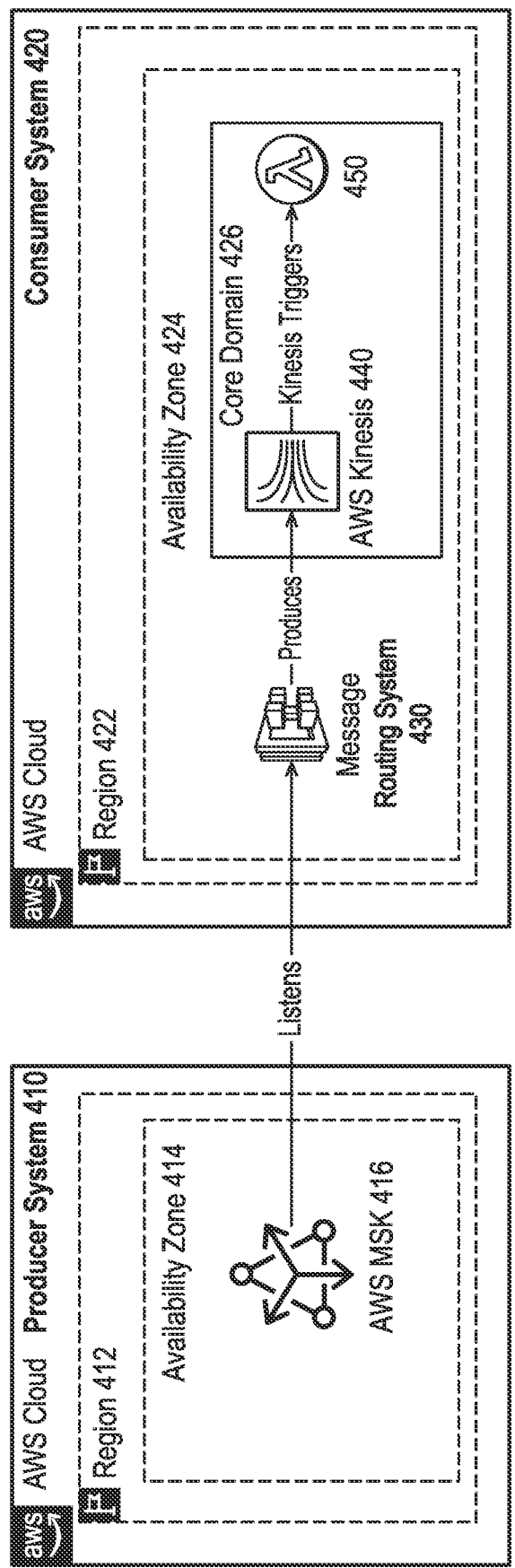
FIG. 4 is a schematic illustrating an example of deployment of a message routing system according to the present disclosure.

FIG. 4 is a schematic illustrating an example of deployment of a message routing system according to the present disclosure. As shown in FIG. 4, there is provided a producer system 410 and a consumer system 420, both systems being deployed on a third-party cloud environment, which in this example is an Amazon Web Services (AWS) Cloud.

The producer system 410 includes a first region 412, which corresponds to a physical location where AWS has one or more data centres. The first region 412 further includes a first availability zone 414 which corresponds to a physically isolated location within the first region 412. AWS Managed Kafka 416 is hosted within the first availability zone 414 for streaming data and processing events.

The consumer system 420 includes a second region 422, which corresponds to a physical location where AWS has one or more data centres. The second region may be the same region as the first region 412 or it may be a different region. The second region 422 further includes a second availability zone 424 which corresponds to a physically isolated location with the second region 422. The second availability zone 424 may be the same as the first availability zone 412 or it may be a different availability zone. Within the second availability zone 424, Amazon Kinesis 440 is hosted within a core domain 426 of the first availability zone 424 along with an events listener module 450 (which may be an Amazon Lambda service). Furthermore, a message routing module 430 is deployed. The message routing system 430 in this example may be an embodiment of the message routing system 100 as described with reference to FIG. 1, and is thus capable of performing all the functionalities of the message routing system 100. More specifically, at least in this example, the message routing system 430 is configured to receive ("listens") content messages from AWS Managed Kafka 416 hosted in the producer system 410 and route ("produces") these content messages towards Amazon Kinesis 440 hosted in the consumer system 420. These content messages may in turn trigger code execution at the events listener module 450 in response to the received content messages (which may be referred to as "events" in this context).

Although FIG. 4 only shows the first availability zone 414 and the second availability zone 424, it will be appreciated that depending on the resiliency requirements of the consumer system 420, additional availability zones may be provided so as to implement the deployment of the message routing system 430 in each availability zone.

Figure 5:
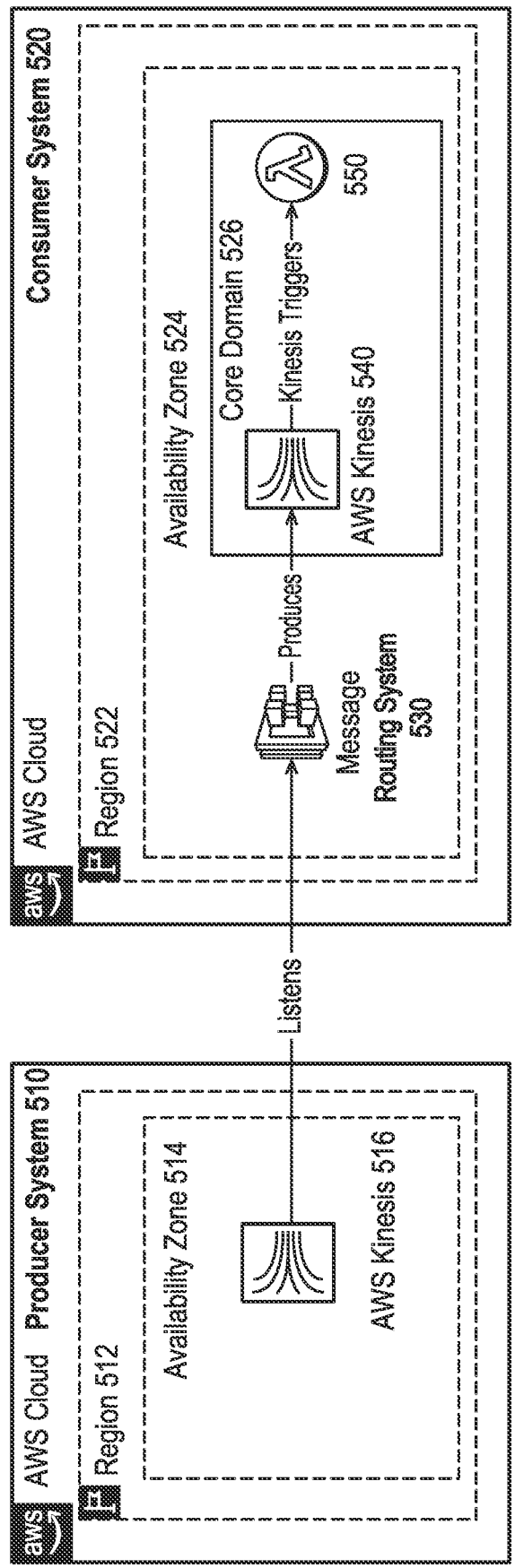
FIG. 5 is a schematic illustrating an example of deployment of a message routing system according to the present disclosure.

FIG. 5 is a schematic illustrating an example of deployment of a message routing system according to the present disclosure. As shown in FIG. 5, there is provided a producer system 510 and a consumer system 520, both systems being deployed on a third-party cloud environment, which in this example is an Amazon Web Services (AWS) Cloud.

Similar to the arrangement shown in FIG. 4, the producer system 510 in FIG. 5 includes a first region 512, which corresponds to a physical location where AWS has one or more data centres. The first region 512 further includes a first availability zone 514 which corresponds to a physically isolated location within the first region 512. A first Amazon Kinesis 516 is hosted within the first availability zone 514 for streaming data and processing events.

The consumer system 520 includes a second region 522, which may be the same region as the first region 512 or it may be a different region. The second region 522 further includes a second availability zone 524 which corresponds to a physically isolated location with the second region 522. The second availability zone 524 may be the same as the first availability zone 514 or it may be a different availability zone. Within the second availability zone 524, a second Amazon Kinesis 540 is hosted within a core domain 526 of the first availability zone 524 along with an events listener module 550 (which may be an Amazon Lambda service). Furthermore, a message routing module 530 is deployed. The message routing system 530 in this example may be an embodiment of the message routing system 100 as described with reference to FIG. 1, and is thus capable of performing all the functionalities of the message routing system 100. More specifically, at least in this example, the message routing system 530 is configured to receive ("listens") content messages from the first Amazon Kinesis 516 hosted in the producer system 510 and route ("produces") these content messages towards Amazon Kinesis 540 hosted in the consumer system 520. These content messages may in turn trigger code execution at the events listener module 550 in response to the received content messages (which may be referred to as "events" in this context).

Although FIG. 5 only shows the first availability zone 514 and the second availability zone 524, it will be appreciated that depending on the resiliency requirements of the consumer system 520, additional availability zones may be provided so as to implement the deployment of the message routing system 530 in each availability zone.

Figure 6:
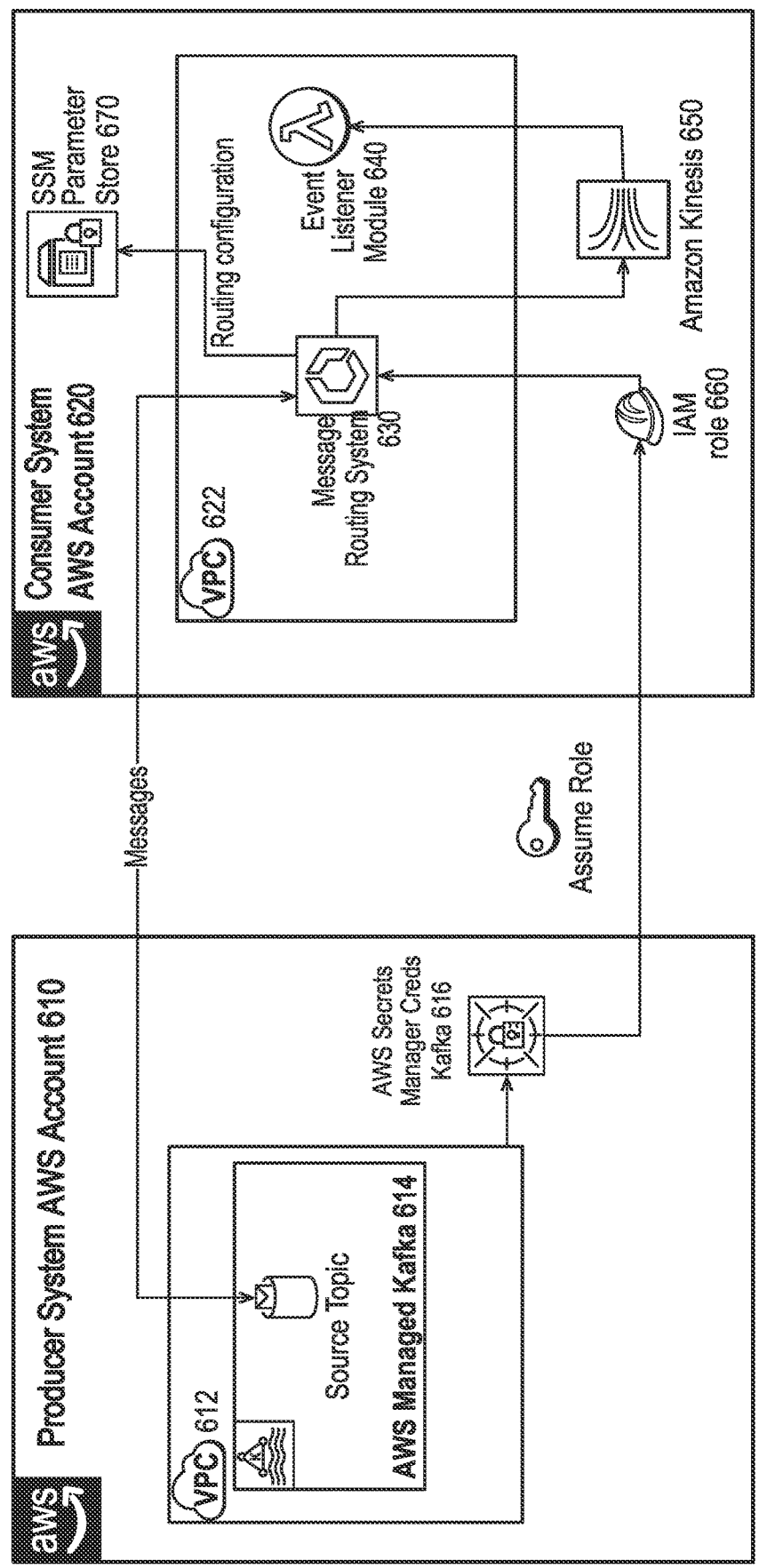
FIG. 6 is a schematic illustrating another example of deployment of a message routing system according to the present disclosure.

FIG. 6 is a schematic illustrating another example of deployment of a message routing system according to the present disclosure. As shown in FIG. 6, there is provided a producer system AWS account 610 and a consumer system AWS account 620. The producer system AWS account 610 comprises a first virtual private cloud (VPC) 612 on which AWS Managed Kafka 614 is hosted. Furthermore, there is also provided an AWS secrets manager 616 at the producer system AWS account 610.

The consumer system AWS account 620 comprises a second VPC 622 on which a message routing system 630 and an events listener module 640 are hosted. Also, at the consumer system AWS account 620, there is provided Amazon Kinesis 650, an identity and access (IAM) role 660, and a parameter store 670. The message routing system 630 in this example may be an embodiment of the message routing system 100 as described with reference to FIG. 1, and is thus capable of performing all the functionalities of the message routing system 100.

In more detail, the message routing system 630 is configured to communicate content messages from AWS Managed Kafka 614 hosted in the producer system AWS account 610 and route these content messages towards Amazon Kinesis 650 hosted in the consumer system AWS account 620. The message routing system 630 is also configured to communicate content messages from Amazon Kinesis 650 hosted in the PPE domain AWS account 620 and route these content messages towards AWS Managed Kafka 614 hosted in the producer system AWS account 610. The routing of content messages is represented by a double-headed arrow between an icon within AWS Managed Kafka 614 (designating a specific Kafka topic) and the message routing system 630 and an arrow between the message routing system 630 and Amazon Kinesis 650.

Each content message to be routed has a corresponding routing configuration that is provided by the parameter store 670, and a message routing module (not shown in FIG. 6) of the message routing system 630 can route the respective content message according to the source and the target specified in the corresponding routing configuration provided by the parameter store 670. Content messages received at Amazon Kinesis 650 can trigger code execution at the events listener module 640 in response to the events represented by the content messages.

At the producer system AWS account 610, the AWS secrets manager 616 can store a secret (e.g. credentials) associated with AWS Managed Kafka 614 and to provide said secret to the IAM role 660 at the consumer system AWS account 620. The IAM role 660 is configured to receive secrets from the AWS secrets manager 616 and to control access to the message routing system 630 on the basis of the received secrets. In some embodiments, the AWS secrets manager 616 may support the use of SCRAM for authenticating users/clients.

Figure 7:
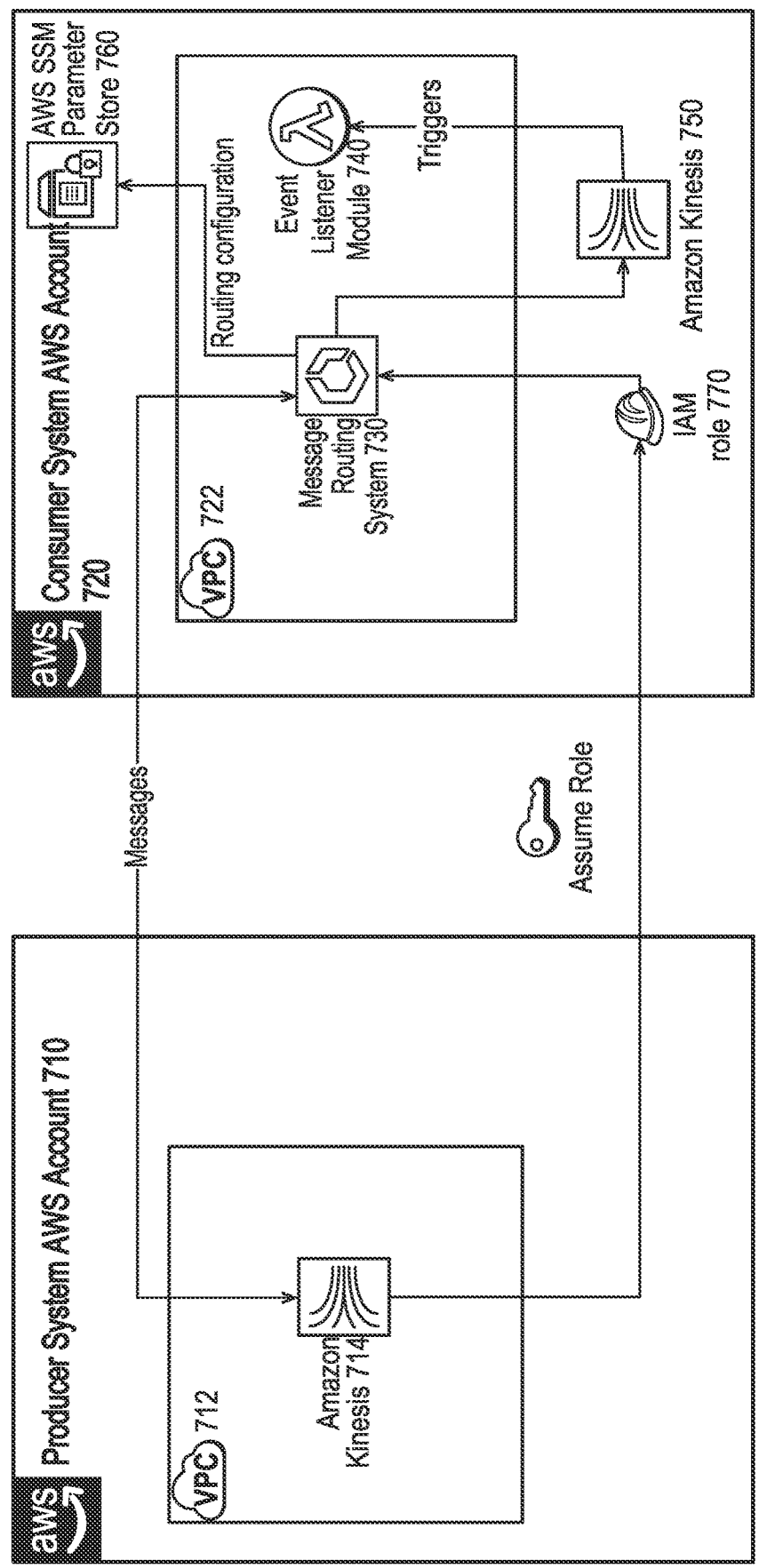
FIG. 7 is a schematic illustrating another example of deployment of a message routing system according to the present disclosure.

FIG. 7 is a schematic illustrating another example of deployment of a message routing system according to the present disclosure. The deployment arrangement of FIG. 7 is similar to that illustrated in FIG. 6, with the main difference being that the arrangement of FIG. 7 involves the deployment of a message routing system between Amazon Kinesis at the consumer domain and Amazon Kinesis at the PPE domain, while FIG. 6 involves the deployment of a message routing system between AWS Managed Kafka and Amazon Kinesis.

As shown in FIG. 7, there is provided a producer system AWS account 710 and a consumer system AWS account 720. The producer system AWS account 710 comprises a first VPC 712 on which a first Amazon Kinesis 714 is hosted. The consumer system AWS account 720 comprises a second VPC 722 on which a message routing system 730 and an events listener module 740 are hosted. Also, at the consumer system AWS account 720, there is provided a second Amazon Kinesis 750, a parameter store 760, and an IAM role 770.

The message routing system 730 in this example may be an embodiment of the message routing system 100 as described with reference to FIG. 1, and is thus capable of performing all the functionalities of the message routing system 100. In more detail, the message routing system 730 is configured to communicate content messages from the first Amazon Kinesis 714 hosted in the producer system AWS account 710 and route these content messages towards the second Amazon Kinesis 750 hosted in the consumer system AWS account 720. The message routing system 730 is also configured to communicate content messages from the second Amazon Kinesis 750 hosted in the consumer system AWS account 720 and route these content messages towards the first Amazon Kinesis 714 hosted in the producer system AWS account 710. The routing of content messages is represented by a double-headed arrow between the first Amazon Kinesis 714 and the message routing system 730 and an arrow between the message routing system 730 and the second Amazon Kinesis 750. The IAM role 770 at the consumer system AWS account 720 is configured to control access to the message routing system 730 by granting permission based on a defined set of permissions policies.

Each content message to be routed has a corresponding routing configuration that is provided by the parameter store 760, and a message routing module (not shown in FIG. 7) of the message routing system 730 can route the respective content message according to the source and the target specified in the corresponding routing configuration provided the parameter store 760. Content messages received at the second Amazon Kinesis 750 can trigger code execution at the events listener module 740 in response to the events represented by the content messages.

Figure 8:
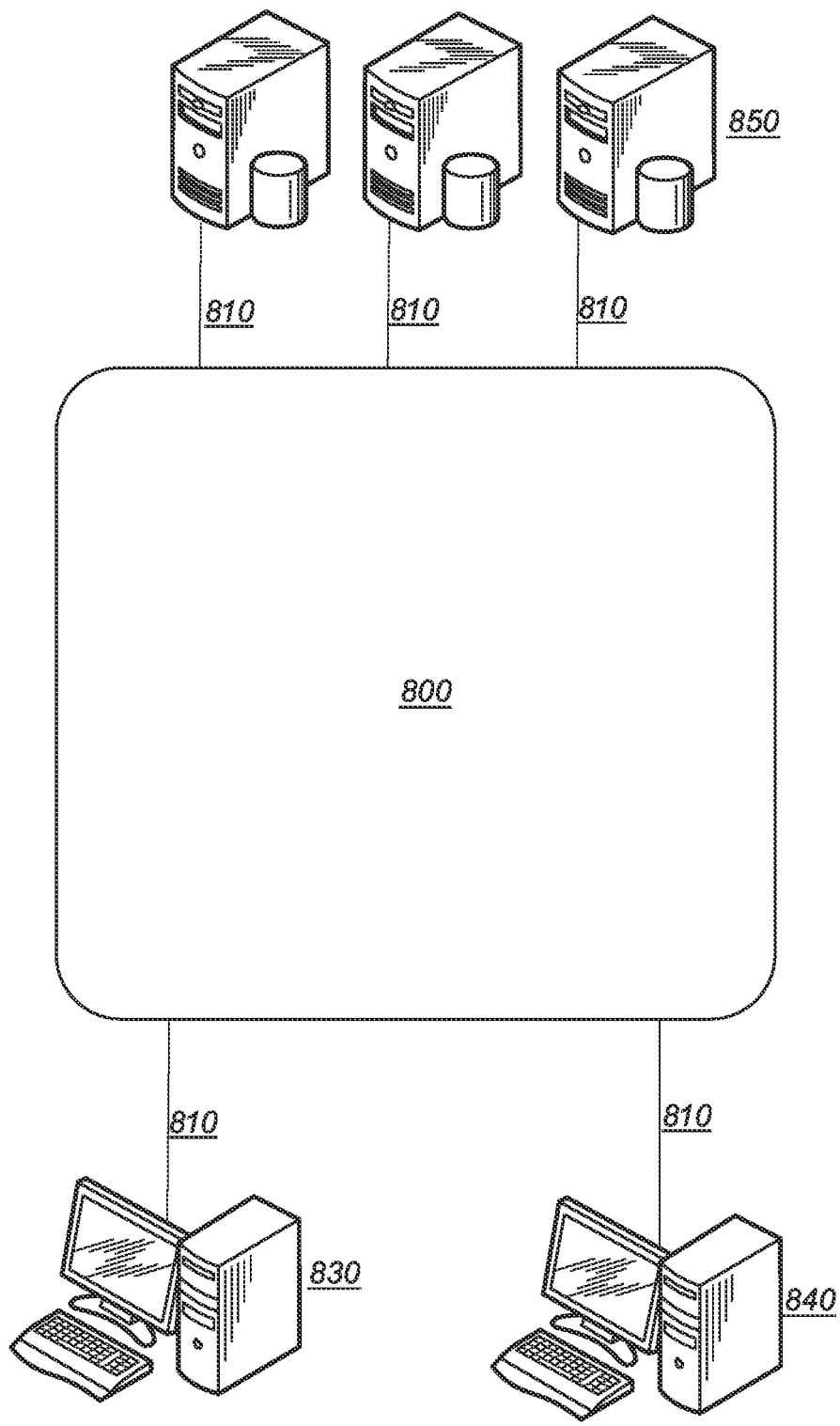
FIG. 8 is a schematic of an exemplary system for implementing systems and methods of the present disclosure.
Figure 9:
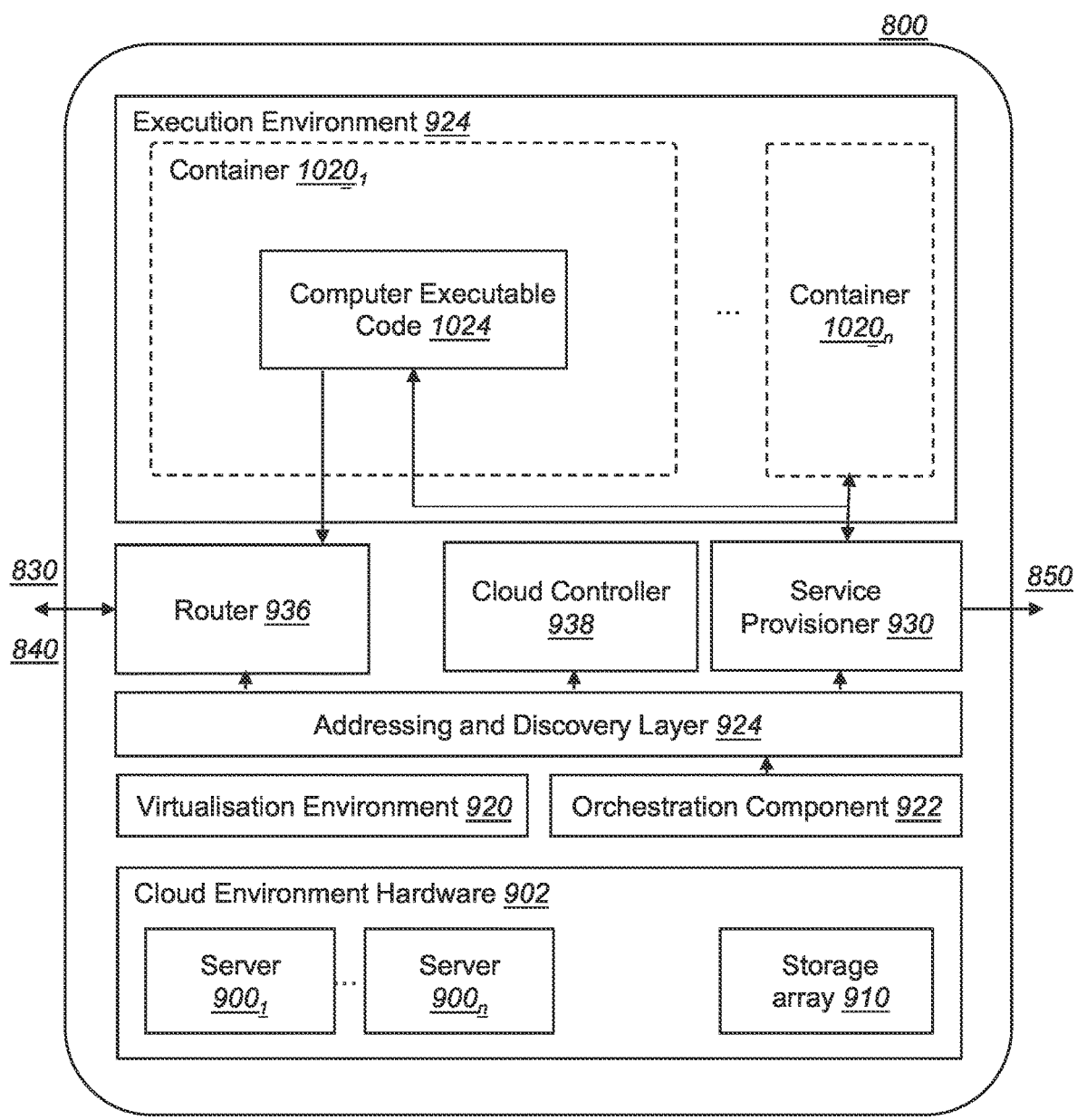
FIG. 9 is a schematic of an exemplary third-party cloud environment for implementing systems and methods of the present disclosure.
Figure 10:
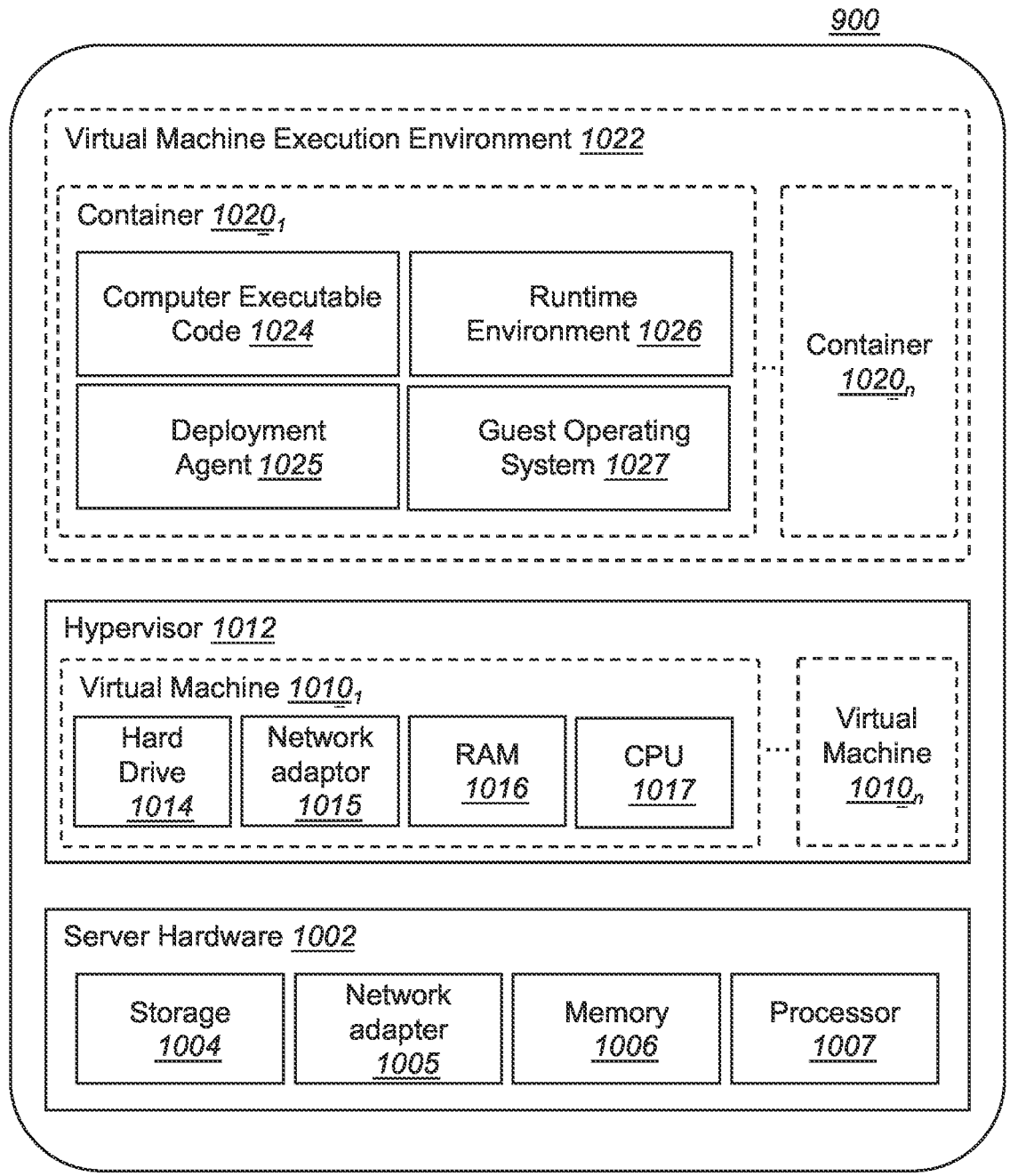
FIG. 10 is a schematic of an exemplary computer hardware for implementing a method of the present disclosure.

FIGS. 8 to 10 are schematics illustrating various aspects of a cloud computing environment system that may comprise the message routing system as described herein, and computer hardware that is configured to implement the cloud computing environment system, the message routing system as described herein, of the methods described herein.

FIG. 8 is a schematic illustrating an exemplary system for implementing a method of the invention. As shown in FIG. 8, cloud environment 800 is communicatively coupled via communication network 810 to secure provider 830, one or more users 840, and one or more external providers 850. In some embodiments, communication network 810 may be implemented or facilitated using one or more local or wide-area communications networks, such as the Internet, WiFi networks, WiMax networks, and the like. Generally, the Internet is used. Preferably, communication network 810 may utilise encryption (e.g., Secure Sockets Layer) to secure data being transferred over the communication network 810 to the cloud environment 800.

Cloud environment 800 is owned and maintained by a third party, i.e. a party that is not the secure provider 830, not one of the one or more users 840, and not one of the external providers 850. Accordingly, cloud environment 800 may be referred to as "a third-party cloud environment". Examples of third-party cloud environments include Amazon Web Services (AWS), Google Cloud Platform, and IMB Cloud. By connecting to a multitude of users 840, cloud environment 800 is able to benefit from economies of scale, thereby making processing and storing large quantities of data in cloud environment 800 efficient.

Typically, cloud environment 800 hosts computer executable code 1024 (not shown) which is executed in the cloud environment 800 in response to a request from user 840. Execution of the computer executable code 1024 causes data to be processed, and the output data produced by executing the computer executable code 1024 is available for user 840 to access. In this way, the computer resources required for data processing are outsourced from the user to the cloud environment 800. This is advantageous because it means that user 840 does not have to provision and maintain their own physical computer hardware. Moreover, user 840 can send the request from anywhere, as long as they have connection to cloud environment 800 via communication network 810. Since the communication network 810 is typically the Internet, which is ubiquitous, the accessibility of cloud environment 800 to user 840 is extremely high. This is convenient as user 840 does not have to be physically present at a particular location in order to access cloud environment 800. User 840 of the cloud environment 800 may additionally or alternatively develop computer executable code 1024 for execution in the cloud environment 800. User 840 can access computer executable code 1024 in cloud environment 800 through a web browser or any other appropriate client application residing on a client computer.

When executed, computer executable code 1024 may process data or use data. This data is made available to the cloud environment 800 by including particular services in the computer executable code 1024 such as access to REST (Representational State Transfer) APIs (Application Programming Interface) or similar communication protocols. REST APIs work by making HTTP requests to GET, PUT, POST and DELETE data. Thus, when the computer executable code 1024 makes a request for data, it may do so by making a HTTP GET request to the data source. Such services (and therefore data) may be provided either internally within the cloud environment 800, or externally by one or more external providers 850.

Secure provider 830 is a special type of user 840 which is not only able to interact with cloud environment 800 in the same way as user 840 (i.e. send requests to cause computer executable code 1024 to be executed in the cloud environment 800, and develop computer executable code 1024 to be executed in the cloud environment 800), but is also able to provide services (and therefore data) to the cloud environment 800. Accordingly, the secure provider 830 may be thought of as a hybrid user/external provider. Secure provider 830 has additional security provisions over user 840 and external providers 850 because data provided by the secure provider 830 may be protected data and/or the computer executable code developed by the secure provider 830 may be protected.

FIG. 9 shows an exemplary third-party cloud environment 800 for implementing a method of the invention. As seen in FIG. 9, cloud environment 800 comprises cloud environment hardware 902 that can be invoked to instantiate data processing, data storage, or other computer resources using cloud computing hardware 902 for a limited or defined duration. Cloud environment hardware 902 may comprise one or more servers 900$_1$ to 900$_n$, and a storage array network 910, as well as any other suitable hardware. Cloud environment hardware 902 may be configured to provide a virtualisation environment 920 that supports the execution of a plurality of virtual machines 1010 (not shown) across the one or more servers 900$_1$ to 900$_n$. As described in relation to FIG. 10, the plurality of virtual machines 1010 provide various services and functions for cloud environment 800.

Virtualisation environment 920 of FIG. 9 may include orchestration component 922 that monitors the cloud environment hardware 902 resource consumption levels and the requirements of cloud environment 800 (e.g., by monitoring communications routed through addressing and discovery layer 924), and provides additional cloud environment hardware 902 to cloud environment 800 as needed. For example, if cloud environment 800 requires additional virtual machines 1010 to host new computer executable code 1024, orchestration component 922 can initiate and manage the instantiation of the virtual machines 1010 on the one or more servers 900$_1$ to 900$_n$ to support such needs. In one example implementation, virtualisation environment 920 may be implemented by running Amazon Elastic Compute Cloud (Amazon EC2) on servers 900$_1$ to 900$_n$. It should be recognised that any other virtualization technologies may alternatively be utilised.

Cloud environment 800 supports an execution environment 932 that comprises a plurality of virtual machines 1010 (or containers 1020, as is discussed in relation to FIG. 10) instantiated to host deployed computer executable code 1024. For example, deployment by user 840 or by secure provider 830 of computer executable code 1024 to the cloud environment 800 results in the hosting of computer executable code 1024 in virtual machine 1010$_1$ and/or container 1020$_1$, of execution environment 932.

Computer executable code 1024 can access internal services provided by cloud environment 800 as well as external services from one or more external providers 850 and/or from secure provider 830. Services may include, for example, accessing a REST API, a custom database, a relational database service (e.g., MySQL, etc.), monitoring service, background task scheduler, logging service, messaging service, memory object caching service and the like. A service provisioner 930 serves as a communications intermediary between these available services (e.g., internal services and external services) and other components of cloud environment 800 (e.g., cloud controller 938, router 936, containers 1020) and assists with provisioning available services to computer executable code 1024 during the deployment process.

Service provisioner 930 may maintain a stub for each service available in cloud computing environment 800. Each stub itself maintains service provisioning data for its corresponding service, such as a description of the service type, service characteristics, login credentials for the service (e.g., root username, password, etc.), a network address and port number of the service, and the like. Each stub component is configured to communicate with its corresponding service using an API or similar communications protocol.

Referring back to FIG. 9, addressing and discovery layer 924 provides a common interface through which components of cloud computing environment 800, such as service provisioner 930, cloud controller 938, router 936 and containers 920 in the execution environment 932 can communicate. For example, service provisioner 1030 may communicate through addressing and discovery layer 924 to broadcast the availability of services and to propagate service provisioning data for such services during deployment of computer executable code 1024 in cloud environment 800.

Cloud controller 938 is configured to orchestrate the deployment process for computer executable code 924 that is submitted to cloud environment 800 by the user 840 or the secure provider 830. In particular, cloud controller 938 receives computer executable code 1024 submitted to cloud computing environment 800 from user 840 or secure provider 830 and, as further detailed below, interacts with other components of cloud environment 800 to call services required by the computer executable code 1024 and package the computer executable code 1024 for transmission to available containers 1020. An example cloud controller 938 service is Amazon Elastic Container service (ECS).

Typically, once cloud controller 938 successfully orchestrates the computer executable code 1024 in container 1020, a secure provider 830 and/or a user 840 can access the computer executable code through a web browser or any other appropriate client application residing on a computer of user 840 or service provider 830. Router 936 receives the web browser's access request (e.g., a uniform resource locator or URL) and routes the request to container 1010 which hosts the computer executable code 1024.

It should be recognized that the embodiment of FIG. 9 is merely exemplary and that alternative cloud environment architectures may be implemented consistent with the teachings herein. For example, while FIG. 9 implements cloud computing environment 800 on cloud environment hardware 902, it should be recognized that cloud environment 800 may be implemented by a third-party in an alternative manner and on top of any type of hardware.

FIG. 10 is a schematic of an exemplary server 900 for implementing a method of the invention. In particular, FIG. 10 depicts server 900 comprising server hardware 1002 and virtual machine execution environment 1032 having containers 1020 with computer executable code 1024. The server hardware 1002 may include local storage 1004, such as a hard drive, network adapter 1005, system memory 1006, processor 1007 and other I/O devices such as, for example, a mouse and keyboard (not shown).

A virtualisation software layer, also referred to as hypervisor 1012, is installed on top of server hardware 1002. Hypervisor 1012 supports virtual machine execution environment 1032 within which containers 1020 may be concurrently instantiated and executed. In particular, each container 1020 provides computer executable code 1024, deployment agent 1025, runtime environment 1026 and guest operating system 1027 packaged into a single object. This enables container 1020 to execute computer executable code 1024 in a manner which is isolated from the physical hardware (e.g. server hardware 1002, cloud environment hardware 902), allowing for consistent deployment regardless of the underlying physical hardware.

As shown in FIG. 10, virtual machine execution environment 1032 of server 900 supports a plurality of containers 10201 to 1020n. Docker is an example of a virtual machine execution environment 1032 which supports containers 1020. For each container 10201 to 1020n, hypervisor 1012 manages a corresponding virtual machine 10101 to 1010n that includes emulated hardware such as virtual hard drive 1014, virtual network adaptor 1015, virtual RAM 1016, and virtual central processing unit (CPU) 1017. For example, virtual machine 1010 may function as an equivalent of a standard x86 hardware architecture such that any x86 supported operating system may be installed as a guest operating system 1027 to execute computer executable code 1024 for container 1020. Container 1020 may be provided by virtualisation environment 920, as previously discussed for FIG. 9.

Hypervisor 1012 is responsible for transforming I/O requests from guest operating system 1027 to virtual machines 1010, into corresponding requests to server hardware 1002. In FIG. 10, guest operating system 1027 of container 1020 supports the execution of deployment agent 1025, which is a process or daemon that communicates (e.g., via addressing and discovery layer 924) with cloud controller 938 to receive and unpack computer executable code 1024 and its deployment package. Deployment agent 1025 also communicates with router 936 to provide network routing information for computer executable code 1024 that have been deployed in container 1020. Guest operating system 1027 further supports the execution of runtime environment 1026 within which computer executable code 1024 is executed.

It should be recognized that the various layers and modules described with reference to FIG. 10 are merely exemplary, and that other layers and modules may be used with the same functionality without departing from the scope of the invention. It should further be recognized that other virtualised computer architectures may be used, such as hosted virtual machines.

It will be appreciated that embodiments described herein may be implemented using a variety of different computing systems. In particular, although the figures and the discussion thereof provide an exemplary message routing system and method for operating thereof, these are presented merely to provide a useful reference in discussion various aspects of the invention. It will be appreciated that the boundaries between logic blocks in a block diagram are merely illustrative and that alternative embodiments may merge logic blocks or elements, or may impose an alternative decomposition of functionality upon various logic blocks or elements.

It will be appreciated the above-mentioned functionalities may be implemented as one or more corresponding software modules or components. Method steps implemented in flow diagrams herein, or as described above, may each be implemented by corresponding respective modules; multiple method steps implemented in flow diagrams contained herein, or as described above, may together be implemented by a single module.

It is to be understood that some features of the exemplary embodiments that are described as optional may or may not be part of the claimed invention and features of the disclosed embodiments may be combined. Unless specifically set forth herein, the terms "a", "an", and "the" are not limited to one element but instead should be read as meaning "at least one".

It is to be understood that at least some of the figures and descriptions of the invention have been simplified to focus on elements that are relevant for a clear understanding of the invention, while eliminating, for purpose of clarity, other elements that those of ordinary skill in the art will appreciate may also comprise a portion of the invention. However, because such elements are well known in the art, and because they do not necessarily facilitate a better understanding of the invention, a description of such elements is not provided herein. Furthermore, to the extent that the method does not rely on the particular order of steps set forth herein, the particular order of the steps should not be construed as limitation on the claims.

It will be appreciated that, insofar as embodiments of the invention are implemented by software (or a computer program), then a computer-readable storage medium carrying the computer program may form aspects of the invention. The computer program may have one or more program instructions, or program code, which, when executed by a processor, carries out an embodiment of the invention. The term "program" or "software" as used herein, may be a sequence of instructions designed for execution on a computer system, and may include a subroutine, a function, a procedure, a module, an object method, an object implementation, an executable application, an applet, a servlet, source code, object code, a shared library, a dynamic linked library, and/or other sequences of instructions designed for execution for execution on a computer system. The storage medium may be magnetic disc, an optical disc, or a memory (e.g. a ROM, a RAM, EEPROM, EPROM, flash memory or a portable/removable memory device), etc. The transmission medium may be communications signal, a data broadcast, a communications link between two or more computers, etc.

The invention claimed is:

1. A message routing system comprising:
a message routing module;
a routing configuration module configured to provide a routing configuration for each of one or more content messages, wherein each routing configuration comprises a source of the respective content message and one or more targets for the respective content message, and wherein each of the source and the one or more targets is characterised by a channel and an address;
a first binder module configured to connect a first data streaming application (DSA1) to the message routing module using one or more channels, wherein the first binder module is configured to enable a content message to be routed to and/or from the first data streaming application;

a second binder module configured to connect a second data streaming application (DSA2) to the message routing module using one or more channels, wherein the second binder module is configured to enable a content message to be routed to and/or from the second data streaming application, wherein the first data streaming application is associated with a first cloud-based account and the second data streaming application is associated with a second cloud-based account;

wherein the message routing module configured to:

receive a content message from a data streaming application and a corresponding routing configuration for the content message from the routing configuration module; and route the content message according to the corresponding routing configuration using a stream bridge interface.

2. The message routing system according to claim 1, wherein an address characterising a source or a target designates a content message stream at a corresponding data streaming application.

3. The message routing system according to claim 1, wherein the message routing module is further configured to:

determine that the content message has been delivered; and upon determining that the content message has been delivered, send an acknowledgement to the respective data streaming application specified as the source in the corresponding routing configuration, so as to trigger data offset to be committed with respect to the delivered content message at the respective data streaming application.

4. The message routing system according to claim 1, wherein the first data streaming application (DSA1) is selected from a list including: Amazon Managed Streaming for Amazon Web Services, AWS, Managed Kafka, Amazon Kinesis, Rabbit MQ, Amazon Simple Notification Service, Amazon Simple Queue Service, and Apache RocketMQ, and wherein the second data streaming application (DSA2) is another data streaming application selected from the list.

5. The message routing system according to claim 1, wherein the message routing system is deployed on a consumer domain.

6. The message routing system according to claim 1, further comprising a secrets manager module configured to rotate one or more secrets associated with at least one of the first and second data streaming applications based on a predetermined configuration.

7. The message routing system according to claim 6, wherein at least one of the first and second binder modules comprises a health endpoint configured to:

acquire one or more health status parameters of the respective data streaming application, wherein the one or more health status parameters comprises a secrets rotation parameter indicating whether a secret associated with the respective data streaming application is rotated; and restart the respective data streaming application if at least one of one or more health status parameters does not meet a predetermined criterion.

8. The message routing system according to claim 1, wherein the message routing module is configured to receive the content message by pulling the content message from the respective data streaming application.

9. The message routing system according to claim 1, wherein the routing configuration for a content message comprises a source of the respective content message and a plurality of targets for the respective content message.

10. The message routing system according to claim 1, further comprising a metrics monitoring module configured to determine at least one of a number of content messages received from one of the first data streaming application (DSA1) and the second data streaming application (DSA2) that have been successfully delivered and a number of content messages received from one of the first data streaming application and the second data streaming application that failed to be delivered.

11. A computer-implemented method for operating a message routing system, wherein the message routing system comprises a message routing module, a routing configuration module, a first binder module configured to connect a first data streaming application (DSA1) to the message routing module using one or more channels, the first binder module being configured to enable a content message to be routed to and/or from the first data streaming application, and a second binder module configured to connect a second data streaming application (DSA2) to the message routing module using one or more channels, the second binder module being configured to enable a content message to be routed to and/or from the first data streaming application, the method comprising:

providing, by the routing configuration module, a routing configuration for each of one or more content messages, wherein each routing configuration comprises a source of the respective content message and one or more targets for the respective content message, and wherein each of the source and the one or more targets is characterised by a channel and an address;

receiving, at the message routing module, a content message from one of a first data streaming application and a second data streaming application, and a corresponding routing configuration for the content message from the routing configuration module; and routing, by the message routing module, the content message according to the corresponding routing configuration using a stream bridge interface, wherein the first data streaming application is associated with a first cloud-based account and the second data streaming application is associated with a second cloud-based account.

12. The computer-implemented method according to claim 11, further comprising:

determining, by the message routing module, that the content message has been delivered; and upon determining that the content message has been delivered, sending, by the message routing module, an acknowledgement to the respective data streaming application specified as the source in the corresponding routing configuration, so as to trigger data offset to be committed with respect to the delivered content message at the respective data streaming application.

13. The computer-implemented method according to claim 11, wherein at least one of the first and second binder modules comprises a health endpoint, the method further comprising:

acquiring, by a health endpoint of a binder module, one or more health status parameters of the respective data streaming application, wherein the one or more health status parameters comprises a secrets rotation parameter indicating whether a secret associated with the respective data streaming application is rotated; and restarting the respective data streaming application if at least one of one or more health status parameters does not meet a predetermined criterion.

14. A cloud computing environment system comprising the message routing system according to claim 1.

15. Computer hardware configured to implement the message routing system of claim 1.

16. Computer hardware configured to implement the method of claim 11.

17. Computer hardware configured to implement the cloud computing environment system of claim 14.

* * * * *